United States Patent
Lee

(10) Patent No.: US 8,607,007 B2
(45) Date of Patent: *Dec. 10, 2013

(54) SELECTION OF DATA STORAGE MEDIUM BASED ON WRITE CHARACTERISTIC

(75) Inventor: Jae-Sung Lee, Suwon-si (KR)

(73) Assignee: Seagate Technology International, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 13/433,986

(22) Filed: Mar. 29, 2012

(65) Prior Publication Data

US 2012/0210050 A1    Aug. 16, 2012

Related U.S. Application Data

(63) Continuation of application No. 11/846,747, filed on Aug. 29, 2007, now Pat. No. 8,151,064.

(30) Foreign Application Priority Data

Aug. 30, 2006   (KR) .................. 10-2006-0083124

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 5/00* | (2006.01) |
| *G11B 15/18* | (2006.01) |
| *G11B 21/02* | (2006.01) |

(52) U.S. Cl.
USPC ............... 711/154; 711/4; 711/103; 711/112; 711/115; 710/52; 360/69; 360/75

(58) Field of Classification Search
None
See application file for complete search history.

(56) References Cited

U.S. PATENT DOCUMENTS 5,566,348 A * 10/1996 Dahman et al. ................. 710/18

OTHER PUBLICATIONS

"Evaluating Subject Matter Eligibility Under 35 USC 101", Aug. 2012 Update, Office of Patent Legal Administration, United States Patent and Trademark Office.*

* cited by examiner

*Primary Examiner* — Yaima Rigol
(74) *Attorney, Agent, or Firm* — Cesari & Reed, LLP; Kirk A. Cesari; Christian W. Best

(57) ABSTRACT

A hybrid hard disk drive includes a hard disk drive controller to receive a plurality of write commands from a host, a buffer to receive and store write data, which are input through the hard disk drive controller and correspond to each of the plurality of write commands, a command history tracker to receive the plurality of write commands and analyze a pattern of the plurality of write commands, and a CPU to control storage of the write data, which correspond to each of the plurality of write commands, on a disk or in a flash memory device based on the analysis result by the command history tracker. The drive may determine whether to store write data on the disk or in the flash memory device without operation system support.

20 Claims, 3 Drawing Sheets

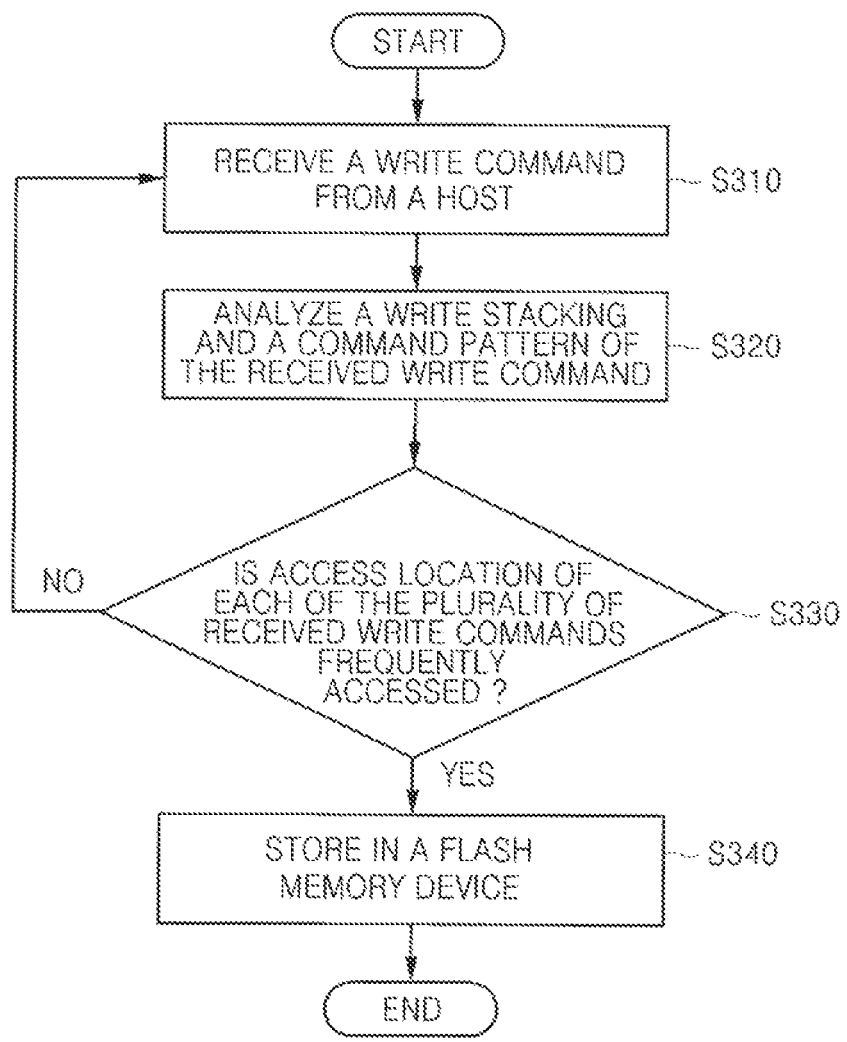

SELECTION OF DATA STORAGE MEDIUM BASED ON WRITE CHARACTERISTIC

CROSS-REFERENCE TO RELATED APPLICATIONS

The present application is a continuation of and claims priority to U.S. patent application Ser. No. 11/846,747, now U.S. Pat. No. 8,151,064 entitled HYBRID HARD DISK DRIVE AND DATA STORAGE METHOD THEREOF, filed on Aug. 29, 2007, which application claims priority under 35 U.S.C. §119(a) of Korean Patent Application No. 2006-0083124, filed on Aug. 30, 2006, the contents of both are hereby incorporated by reference in their entirety.

BACKGROUND OF THE INVENTION

1. Field of the Invention

The present general inventive concept relates to a hybrid hard disk drive (HDD), and more particularly, to a hybrid HDD to select a data storage location without operating system (OS) support, and a data storage method thereof.

2. Description of the Related Art

The hybrid HDD is a data storage apparatus designed to minimize power consumption of the hybrid HDD, and improve performance by additionally installing a flash memory device, which is a non-volatile memory device with a relatively large volume such as 64 M bytes, 128M bytes, or 256 M bytes, in an existing HDD. While most read or write operations are performed in the flash memory device of the hybrid HDD, the hybrid HDD may reduce power consumption by setting a spindle motor, a voice coil motor (VCM), etc. to a power saving mode. Thus, although the power of the hybrid HDD is off, the flash memory device may store (or maintain) data as it is non-volatile.

The hybrid HDD begins to write data on a disk by waking-up a spindle motor, VCM, etc. in a power saving mode only after a memory capacity of the flash memory device reaches a certain level. A general hybrid HDD determines whether to write a predetermined data on the disk or in the flash memory device by using a non-volatile cache command (NVC) according to a Windows operating system (OS).

However, small volume HDDs such as 1.8 inch or 1.0 inch models, which are typically used in consumer electronics (CE) environments instead of a personal computer (PC) environment, should determine whether to store data on the disk or in the flash memory device to maximize performance without OS support. The CE refers to non-PC HDD applications such as a game instrument, a personal video recorder (PVR), Karaoke equipment, a MP3 player, or a media player, etc.

Generally, the flash memory device consumes less power and has faster random operation performance, but performs sequential operations at a slower rate than a HDD performs disk operations. There is no time difference when the flash memory device accesses random operations and sequential operations. But, since the disk of the HDD has a minimized seek distance in sequential operations, the disk has a shorter access time to sequential operations than the flash memory device. However, in case of a random operation of the HDD disk, a longer seek distance causes an access time to substantially increase by a unit of milliseconds.

Therefore, in order to maximize every advantage of a disk and a flash memory based on each basic feature as needed, HDD firmware requires itself to store data in an optimal storage location between a disk and a flash memory device by analyzing a pattern of write commands transferred from a host.

SUMMARY OF THE INVENTION

The present general inventive concept provides a hybrid HDD to determine where to store at least one of write data, transferred from a host, between a disk and a flash memory device without OS support. The general inventive concept also provides a data storage method of the hybrid HDD, and a computer readable medium to store a program to execute the method.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a data storage method of a hybrid hard disk drive. The method includes receiving a first write command from a host, in a first storage operation, receiving and storing a first write data corresponding to the received first write command in a buffer, analyzing the received first write command and at least one second write command already received before receiving the first write command, and in a second storage operation, storing at least one of the first write data stored in the buffer or at least one second write data stored in the buffer, which corresponds to the at least one second write command, on a disk or in a flash memory device based on the analysis result.

The foregoing and/or other aspects and utilities of the present general inventive concept may also be achieved by providing a hybrid hard disk drive including a hard disk drive controller adapted to receive a plurality of write commands, a buffer adapted to receive and store write data, which are input through the hard disk drive controller and correspond to each of the plurality of write commands, a command history tracker to receive the plurality of write commands and to analyze a pattern of the plurality of write commands, and a CPU to control a storage of write data, which correspond to each of the plurality of write commands, on a disk or in a flash memory device in accordance with an analysis result by the command history tracker.

The command history tracker may analyze the pattern based on each logical block address of the received plurality of write commands. The CPU may control storage of all of the write data corresponding to each of the plurality of write commands stored in the buffer on the disk when storage locations for write data corresponding to each of the plurality of write commands are sequential, if not, the CPU may control storage of write data corresponding to at least one of the plurality of write commands in the flash memory device.

The foregoing and/or other aspects and utilities of the present general inventive concept may also be achieved by providing a system including a host to output a plurality of write commands and to write data corresponding to each of the plurality of write commands and a hybrid hard disk drive to analyze a pattern of a received plurality of write commands and to store write data corresponding to each of the plurality of write commands either on a disk or in a flash memory device based on the analysis result. The flash memory may be embodied as a NAND type flash memory device, and the command history tracker may be embodied as a NOR type flash memory device.

The foregoing and/or other aspects and utilities of the present general inventive concept may also be achieved by providing a computer readable medium to store a program to execute the method of storing data in a hybrid hard disk drive, the method including receiving a first write command from a host, receiving and storing a first write data corresponding to the received first write command in a buffer, analyzing the received first write command and at least one second write command already received before receiving the first write command, and storing at least one of the first write data stored in the buffer or at least one second write data stored in the buffer, which corresponds to the at least one second write command, on a disk or in a flash memory device based on the analysis result.

The foregoing and/or other aspects and utilities of the present general inventive concept may also be achieved by providing a hybrid hard disk drive (HDD) including a buffer to receive and temporarily store data, an analysis unit to analyze read and/or write commands corresponding to the data stored in the buffer, and a control unit to control storage of the data stored in the buffer on a disk or in a non-volatile memory based on the analysis of the command.

The foregoing and/or other aspects and utilities of the present general inventive concept may also be achieved by providing a method of storing data in a hybrid hard disk drive, the method including receiving and temporarily storing data in a buffer, analyzing read and/or write commands corresponding to the data stored in the buffer, and storing the data stored in the buffer on a disk or in a non-volatile memory based on the analysis.

The foregoing and/or other aspects and utilities of the present general inventive concept may also be achieved by providing a computer readable medium to store a program to execute the method of storing data in a hybrid hard disk drive, the method including receiving and temporarily storing data in a buffer, analyzing read and/or write commands corresponding to the data stored in the buffer, and storing the data stored in the buffer on a disk or in a nonvolatile memory based on the analysis.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 illustrates a flowchart of a data storage method of a hybrid HDD according to an embodiment of the present general inventive concept.

DETAILED DESCRIPTION OF THE PREFERRED EMBODIMENTS

Figure 1:
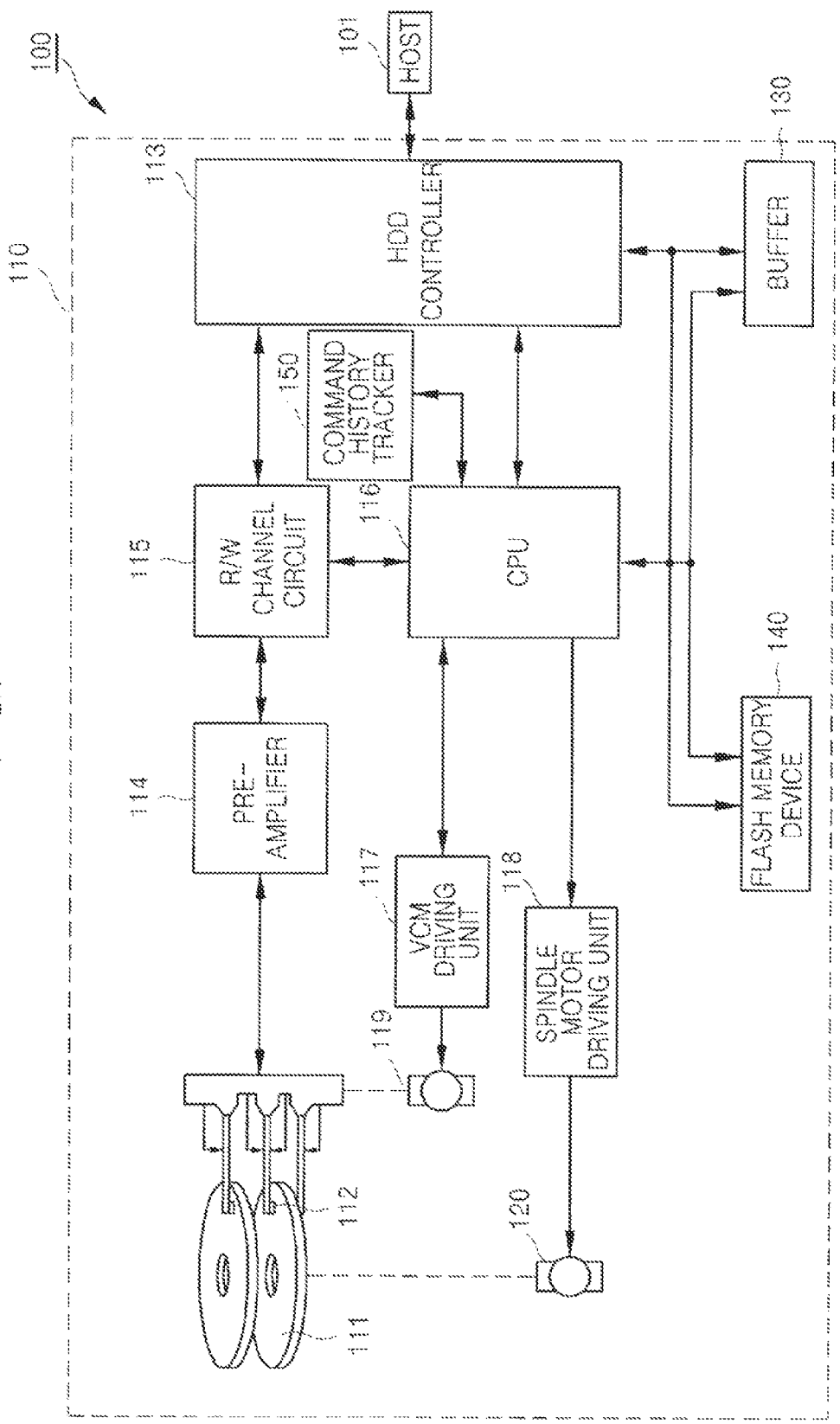
FIG. 1 is a functional block diagram illustrating a hybrid hard disk drive (HDD) installation system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a functional block diagram illustrating a hybrid hard disk drive (HDD) installation system 100 according to an embodiment of the present general inventive concept.

Referring to FIG. 1, the hybrid HDD installation system 100 includes a host 101 and a hybrid HDD 110. The hybrid HDD installation system (or system) 100 may be PC or CE.

The host 101 outputs at least one command, e.g., a write command or a read command, to the hybrid HDD 110 through a communication network (channel).

The hybrid HDD 110 includes a plurality of disks 111, a plurality of heads 112, a HDD controller 113, a read/write (R/W) channel circuit 115, a pre-amplifier 114, a central processing unit (CPU) 116, a voice coil motor (VCM) driving unit 117, a spindle motor driving unit 118, a VCM 119, a spindle motor 120, a buffer 130, a flash memory device 140, and a command history tracker 150.

Each of the plurality of disks 111 is where data are stored, and each of the plurality of heads 112 reads or writes data while flying on a corresponding disk among the plurality of disks 111 under the control of the CPU 116.

The HDD controller 113 writes data, which are received from the host 101, on a corresponding disk among the plurality of disks 111 through the pre-amplifier 114 and the R/W channel circuit 115, or transfers read data to the host 101 after reading data on a corresponding disk among the plurality of disks 111.

In a data reading operation, the R/W channel circuit 115 detects a data pulse from an amplified analog read signal, which is output from the pre-amplifier 114, and outputs read data to the HDD controller 113 after decoding the detected data pulse. Also in a data writing operation, the R/W channel circuit 115 encodes write data, which are output from the HDD controller 113, and outputs the encoded data to the pre-amplifier 114.

When reading data, the pre-amplifier 114 amplifies a picked-up signal by a corresponding head among the plurality of heads 112, and outputs the amplified analogue read signal to the R/W channel circuit 115. When writing data, the pre-amplifier 114 controls the writing of encoded data, which are output from the R/W channel circuit 115, on a corresponding disk among the plurality of disks 111 through a corresponding head among the plurality of heads 112.

The CPU 116 controls a VCM driving unit 117 and a spindle motor driving unit 118 to control a track seek and/or a track following in response to a read command or a write command, and more particularly, by receiving the read or write command, and according to a result of recognizing the received read or write command after decoding the same, which are output from the host 101 and inputted through the HDD controller 113. The CPU 116 may be embodied as a micro controller, or a digital signal processor (DSP).

The VCM driving unit 117 controls at least one of the plurality of heads 112 by driving the VCM 119 in response to a control signal to control each location of the plurality of heads 112, which are supplied from the CPU 116. The spindle motor driving unit 118 rotates the plurality of disks 111 by driving the spindle motor 120 according to a control value, generated from the CPU 116, which controls rotations of the plurality of disks 111.

The buffer 130 temporarily stores data transferred among the host 101, the HDD controller 113, the CPU 116, and the flash memory 140. Generally, the buffer 130 may be embodied as a DRAM device, a volatile memory, but is not restricted thereto.

The flash memory 140 is a non-volatile memory capable of storing data, which is stored in the buffer 130, and capable of keeping the stored data even when a power of a hybrid HDD 110 is off. The flash memory 140 may be embodied as a NAND type flash EEPROM memory device or a NOR type flash EEPROM memory device.

The command history tracker 150 analyzes a pattern of commands, e.g., write commands, received from the HDD controller 113 through interactions with the CPU 116. The pattern of the commands may be a pattern of locations, to which a corresponding head among the plurality of heads 112 should access on a corresponding disk among the plurality of disks 111, according to each of the commands. The pattern of the locations may be analyzed based on a physical address or a logical address where data, corresponding to each of the commands, will be stored. The command history tracker 150 may analyze a pattern of commands according to a logical block address (LBA) or a cylinder head sector (CHS), but is not restricted thereto.

The command history tracker 150 may be embodied as a firmware, and may be embodied in the CPU 116 according to various embodiments herein. Also, the command history tracker 150 may be embodied as a NAND type flash memory device or a NOR type flash memory device, but is not restricted thereto. Through the pattern analysis of the commands, the data temporarily stored in the buffer 130, more specifically data to be written, under the control of a HDD controller 113, which operates under the control of a CPU 116, are stored on a corresponding disk among the plurality of disks 111, or in the flash memory device 140.

Among data stored in the buffer 130, data to be stored in sequential storage locations are stored on a corresponding disk among the plurality of disks 111 and data not to be stored in sequential storage locations are stored in the flash memory device 140. The HDD controller 113, the R/W channel circuit 115, the CPU 116, and the command history tracker 150 may be embodied as a chip, but are not restricted thereto. Also, the VCM driving unit 117 and the spindle motor driving unit 118 may be embodied as a chip, but are not restricted thereto.

Figure 2:
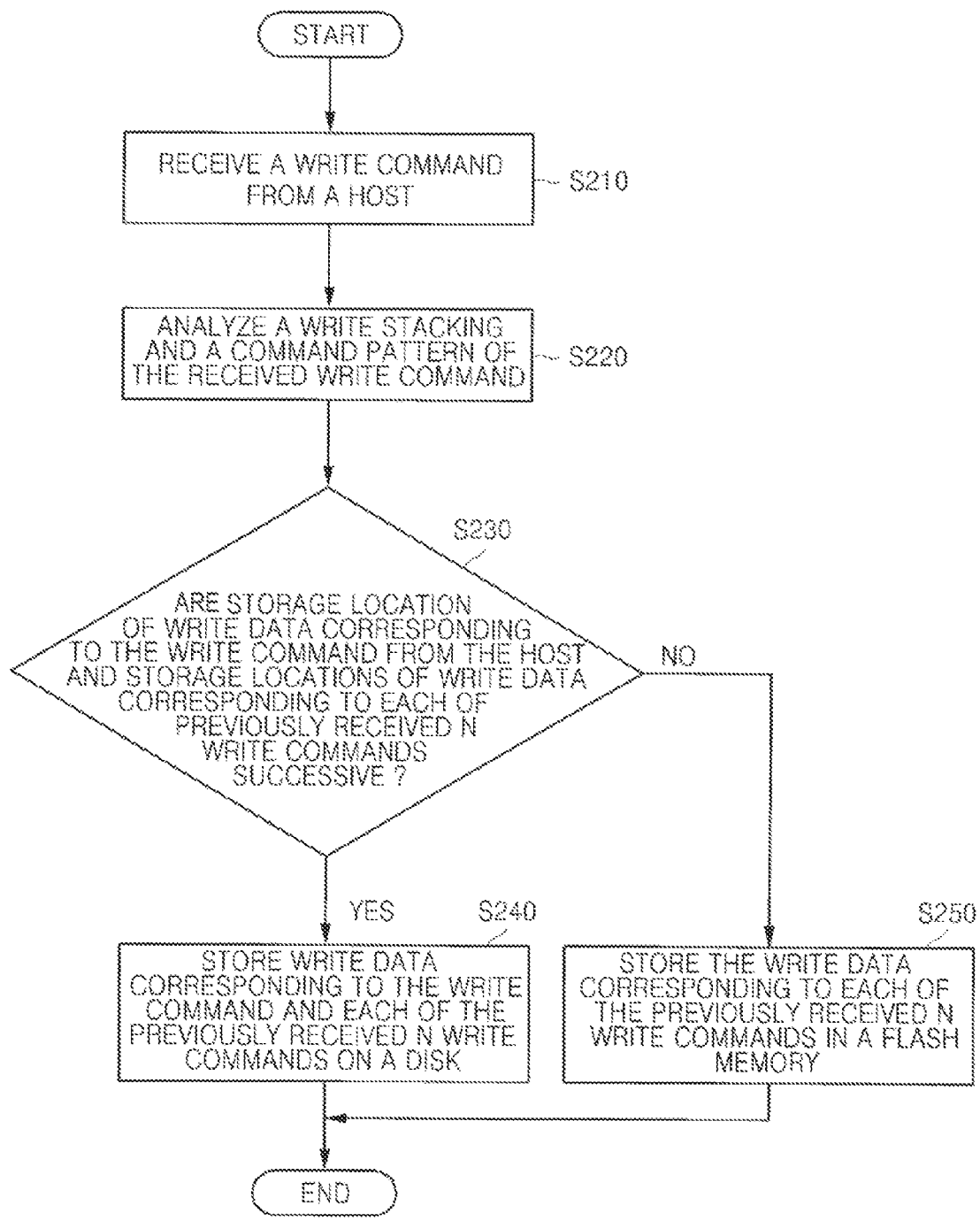
FIG. 2 illustrates a flowchart of a data storage method of a hybrid HDD according to an embodiment of the present general inventive concept.

FIG. 2 illustrates a flowchart of a data storage method of a hybrid HDD according to an embodiment of the present general inventive concept. Referring to FIGS. 1 and 2, the HDD controller 113 receives a predetermined write command output from a host 101 (operation S210). The CPU 116 receives the predetermined write command output from the HDD controller 113, and decodes and recognizes the received write command. The command history tracker 150 analyzes a write stacking and a command pattern of the predetermined write command, which is input through the CPU 116, or through interactions with the CPU 116 (operation S220).

The write stacking output signal indicates to the host 101 that a write command has been completed after storing write data corresponding to the write command only in the buffer 130 instead of on a corresponding disk among the plurality of disks 111, or in the flash memory device 140. The command pattern analysis analyzes an access location according to the write command, and also analyzes a storage location of write data corresponding to the write command, e.g., a LBA. The storage location is a physical location or a logical location on a corresponding disk among the plurality of disks 111, and may be analyzed based on a LBA or a CHS.

That is, based on an analysis result of the command history tracker 150, the CPU 116 may determine whether a storage location of write data, which corresponds to a predetermined write command output from a host 101, e.g., currently input write command, and storage locations of write data, which correspond to each of previously received N write commands, are sequential or random (operation S230). Here, N is a natural number. According to an embodiment of the general inventive concept, the command history tracker 150 may perform this operation S230. Write data, corresponding to each of the previously received N write commands, are stored in the buffer 130.

According to a result of the determination in operation S230, when the storage location of write data corresponding to the predetermined write command (e.g., currently input write command) and the storage locations of write data, which correspond to each of the previously received N write commands, are sequential to each other, write data, which correspond to the predetermined write command and each of the previously received N write commands, are stored on a corresponding disk among the plurality of disks 111 under at least one of the control of the CPU 116 or the HDD controller 113 (operation S240).

For instance, when a first write data W_DATA0, to be stored in a first storage location such as LBA0 in a buffer 130, and a write data W_DATA1, to be stored in a second storage location such as LBA1 in the buffer 130, are already stored, and a predetermined write command, e.g., currently input write command, which stores write data W_DATA2 in a third storage location, e.g., LBA2, is output from a host 101, if N is 2 and the first storage location to the third storage location LBA0, LBA1, and LBA2 are sequential on a predetermined disk, the first write data to the third write data, W_DATA0, W_DATA1 and W_DATA2 will be stored on the disk under at least one of the control of the CPU 116 or the HDD controller 113 (operation S240).

N can be a natural number, and (N+1) is a number of minimum sequential write commands to be written on the disk and a natural number, selected by a result of a predetermined test, which makes optimum command performance possible.

Also, according to a result of the determination in operation S230, when a storage location of write data corresponding to the predetermined write command and storage locations of write data corresponding to each of previously received N write commands are not sequential, but random, the write data corresponding to each of the previously received N write commands are stored in the flash memory device 140 under at least one of the control of the CPU 116 or the HDD controller 113 (operation S250).

For instance, when N is 2, and a first write data W_DATA0 and a second write data W_DATA1 to be respectively stored in a first storage location, e.g., LBA0 and a second storage location, e.g., LBA 1 in the buffer 130, are already stored, and a predetermined write command to store a third write data W_DATA100 in a third storage location LBA100 is output from the host 101, the first and the second storage locations LBA0 and LBA1 are sequential on a predetermined disk, but the third storage location LBA100 is not sequential to the second storage location LBA1.

Therefore, the first write data W_DATA0 and the second write data W_DATA1 are stored in the flash memory device 140 under at least one of the control of the CPU 116 or the HDD controller 113 (operation S250).

FIG. 3 illustrates a flowchart of a data storage method of a hybrid HDD according to an embodiment of the present general inventive concept. Referring to FIGS. 1 and 3, the HDD controller 113 receives a plurality of write commands output from a host 101 (operation S310). Then, the command history tracker 150 analyzes a write stacking and/or a command pattern for each of a received plurality of write commands (operation S320), and determines whether access locations of each of the plurality of received write commands, i.e., storage locations of data corresponding to each of the plurality of the write commands, are frequently accessed on a corresponding disk among a plurality of disks 102 (operation S330).

Based on the determination result, when storage locations of each of the write data are frequently accessed, each of the write data is stored in a flash memory device 140 (operation S340). Each of the write data stored respectively in the frequently accessed storage locations may be an OS-related file, a file allocation table (FAT) related to a file system, or boot-image related data used in booting, but it is not restricted thereto.

Sequential and random data stored through a data storage method of hybrid HDD according to an embodiment of the present general inventive concept may be read from a host 101. The data stored in sequential locations may be read from a corresponding disk among a plurality of disks 111, and the data stored in random locations may be read from a flash memory device 140. Also, data to be stored on a disk can be stored in the flash memory device 140 if the data are stored in a storage location which is frequently accessed.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and devices to transmit carrier waves (such as data transmission through the Internet via a server). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains. The method illustrated in FIGS. 2 and 3 can be stored in the computer-recorded medium in a form of computer-readable codes to perform the method when the computer reads the computer-readable codes of the recording medium.

As described above, a hybrid HDD of the present general inventive concept includes a command history tracker to analyze a pattern of a plurality of write commands received from a host. The hybrid HDD determines whether to store write data, which correspond to each of the plurality of write commands, on a disk or in a flash memory device based on the analysis result by the command history tracker without operation system support from a host.

Also, the hybrid HDD may reduce power consumption by storing write data, to be stored in sequential storage locations, in a disk and write data, to be stored in random storage locations, in a flash memory device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus comprising:
a first data storage medium;
a second data storage medium, wherein the first data storage medium has a faster access time for write operations performed on data in sequential order than the second data storage medium, and the second data storage medium has faster access time for write operations performed on data in random order than the first data storage medium;
a control unit configured to:
receive a plurality of write commands and analyze a pattern of the plurality of write commands;
store first write data corresponding to a first-received write command and second write data corresponding to a second-received write command on the first data storage medium when the control unit determines that storage locations of the first write data and the second write data are sequential; and
store the first write data to the second data storage medium when the control unit determines that storage locations of the first write data and the second write data are not sequential.

2. The data storage device of claim 1, wherein the control unit analyzes the pattern based on each logical block address of the received plurality of write commands.

3. The data storage device of claim 1, the control unit comprising:
an analysis unit to receive the plurality of write commands and to analyze the pattern of the plurality of write commands; and
a control circuit to store the first write data and the second write data to the first data storage medium or the second data storage medium based on the analysis.

4. The data storage device of claim 3, wherein the control circuit comprises a micro controller or a digital signal processor.

5. The data storage device of claim 3, wherein the analysis unit comprises a flash EEPROM memory.

6. The data storage device of claim 1, wherein the first data storage medium and the second data storage medium comprise nonvolatile memory devices.

7. The data storage device of claim 1, wherein the second data storage medium comprises a flash EEPROM memory.

8. The data storage device of claim 1 further comprising a buffer to receive and temporarily store the first write data and the second write data.

9. A system comprising:
a host to output a first write command and a second write command after the first write command;
a data storage device adapted to:
analyze a pattern of the first and second write commands;
store write data corresponding to the first and second write commands to a first data storage medium when storage locations for write data corresponding to the first and second write commands are sequential; and
store write data corresponding to the first write command to a second data storage medium when storage locations for write data corresponding to the first and second write commands are not sequential.

10. The system of claim 9, wherein the data storage device comprises:
the first data storage medium;
the second data storage medium, wherein the first data storage medium has a faster access time for write operations performed on data in sequential order than the second data storage medium, and the second data storage medium has faster access time for write operations performed on data in random order than the first data storage medium;
a controller configured to:
receive a plurality of write commands and to analyze a pattern of the plurality of write commands; and
store write data corresponding to each of the plurality of write commands on the first data storage medium or on the second data storage medium based on the analysis result.

11. The system of claim 10, wherein the controller comprises a command history tracker to analyze the pattern of the plurality of write commands, and wherein the command history tracker comprises a NOR type flash memory device.

12. The system of claim 10, wherein the second data storage medium comprises a NAND type flash memory device.

13. A data storage memory device storing instructions to cause a processor to perform a method comprising:
receiving and temporarily storing data in a buffer;
analyzing a first write command and a second write command corresponding to the data stored in the buffer, the first write command received prior to the second write command;
storing the data stored in the buffer on a first data storage medium having a first write characteristic when the first write command and the second write command correspond to sequential storage locations; and
storing at least a portion of the data stored in the buffer corresponding to the at least one first write command in a second data storage medium having a second write characteristic when the at least one first write command and the second write command correspond to non-sequential storage locations.

14. The data storage memory device of claim 13, wherein the first write characteristic of the first data storage medium is a first write speed having a faster sequential data write speed than the second data storage medium.

15. The data storage memory device of claim 14, wherein the second write characteristic of the second data storage medium is a second write speed having a faster random data write speed than the first data storage medium.

16. The data storage memory device of claim 15, wherein the analyzing is performed based on each logical block address of the second write command and the first write command.

17. The data storage memory device of claim 15, wherein each storage location for the first write command are sequential.

18. The data storage memory device of claim 15, wherein storing the data stored in the buffer on a first data storage medium or a second data storage medium further comprises:
storing the data corresponding to the second write command on the second data storage medium when a storage location of the second write command is frequently accessed.

19. The data storage memory device of claim 15, wherein storing the data stored in the buffer on a first data storage medium or a second data storage medium further comprises:
storing the data corresponding to the second write command on the second data storage medium when the data corresponding to the second write command comprises operating system related files, file allocation table (FAT), or a boot image.

20. The data storage memory device of claim 15, wherein the second data storage medium comprises a flash memory.

* * * * *